United States Patent [19]

Raser

[11] Patent Number: 4,703,622
[45] Date of Patent: Nov. 3, 1987

[54] THERMODYNAMIC RECIPROCATING APPARATUS WITH A ROLLING CONVOLUTION

[76] Inventor: William H. Raser, 6451 W. 83rd St., Los Angeles, Calif. 90045

[21] Appl. No.: 673,089

[22] Filed: Nov. 19, 1984

[51] Int. Cl.[4] .............................................. F02G 1/04
[52] U.S. Cl. ....................................... 60/517; 60/526; 92/98 D
[58] Field of Search ................. 60/516, 517, 525, 526; 62/6; 92/98 D

[56] References Cited

U.S. PATENT DOCUMENTS 4,309,872  1/1982  Raser et al. ...................... 60/520 X
4,490,974  1/1985  Colgate .............................. 60/517 X

*Primary Examiner*—Stephen F. Husar

[57] ABSTRACT

A resilient diaphragm using a single non-circular rolling convolution to seal pressure around a pistonlike body. The outer wall of the convolution and the perimeter of the diaphragm have the shape of a racetrack, i.e., of a rectangle with two semicircles added. The rectangle part may be made of sheet metal but at least the curved part of the convolution within the semicircles must be of elastomer material such as a rubber coated fabric. The shape of the inner wall may include some additional curvature so that the two walls can have equal lengths. Production of this diaphragm does not require a full-sized curing mold. When it is used in place of a piston in a Stirling engine, a thermal barrier may be needed to protect the elastomer part from the heat and a configuration is preferred in which the reciprocating diaphragm and an array of slender-column displacing elements form a compact package on opposite sides of a cylindrical wall.

1 Claim, 12 Drawing Figures

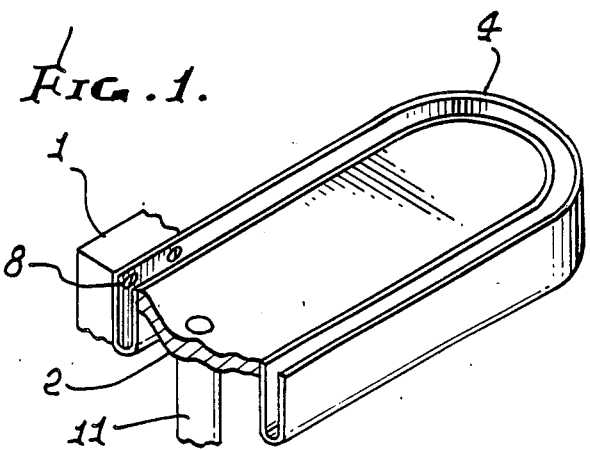
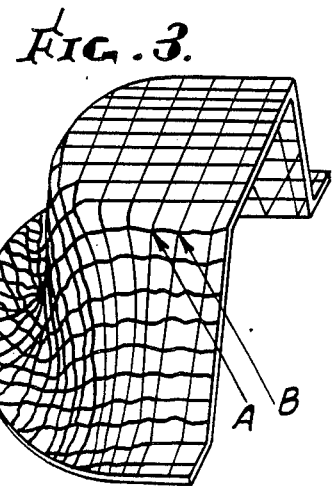
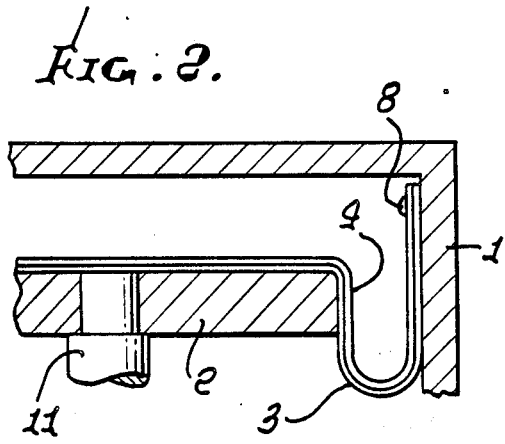
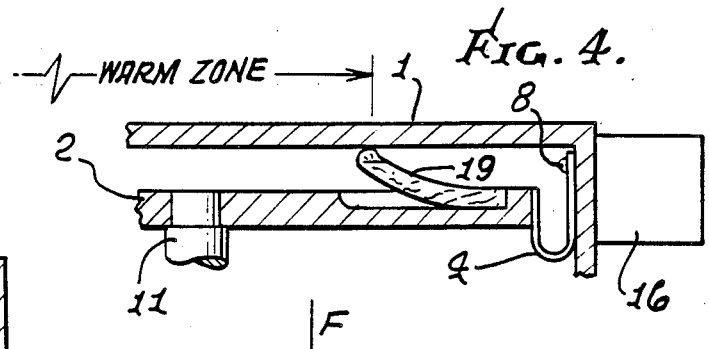
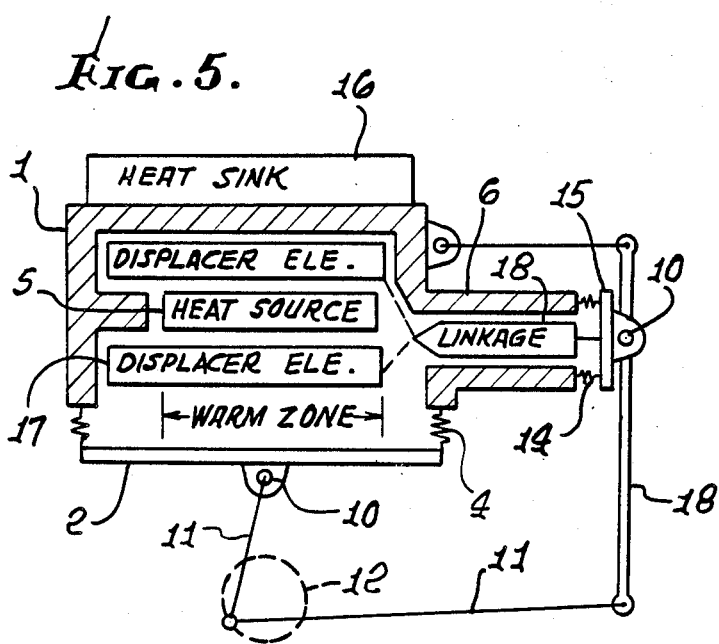
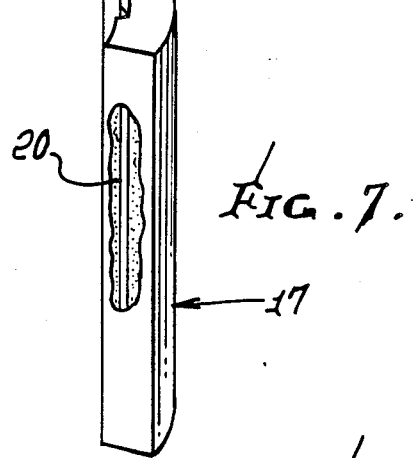
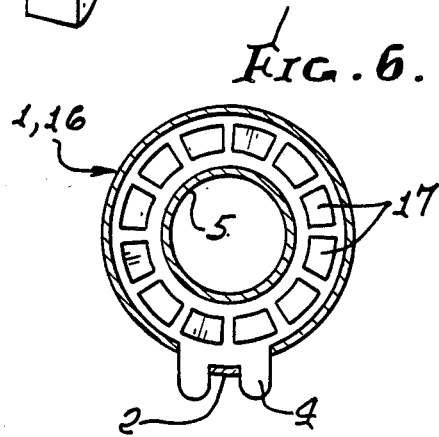

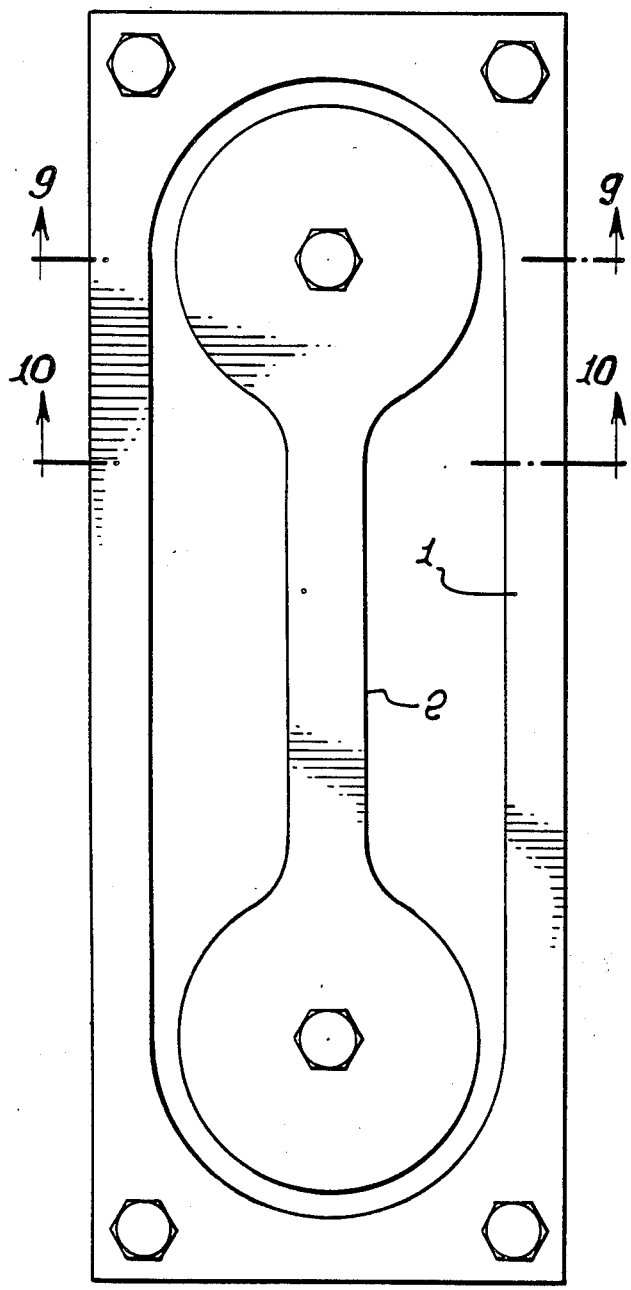
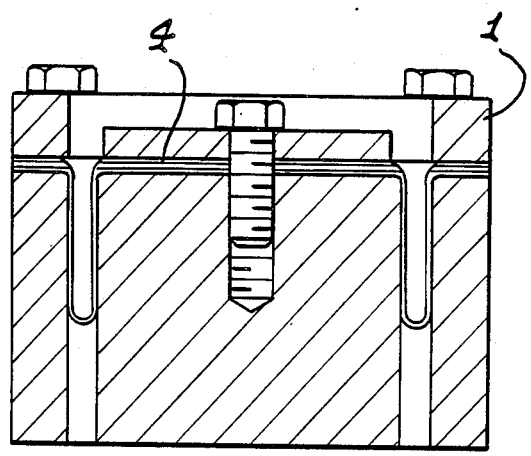
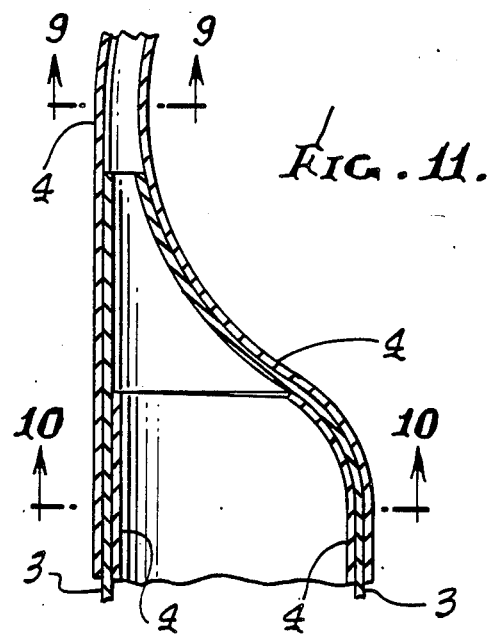
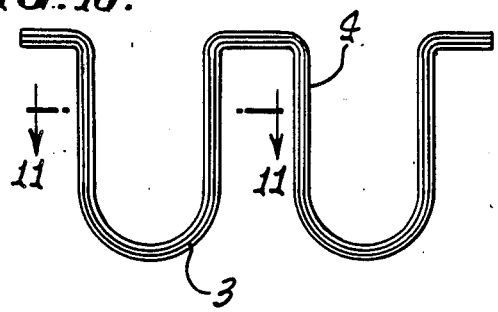
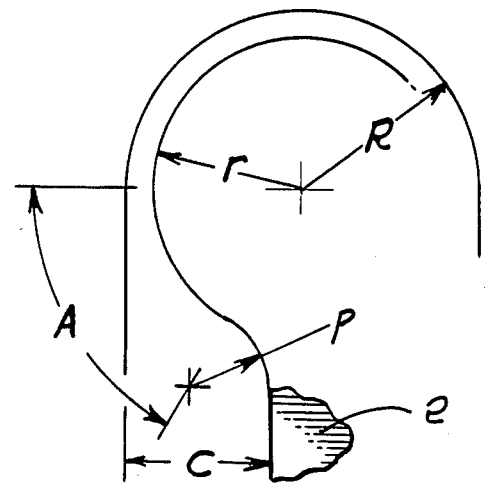

THERMODYNAMIC RECIPROCATING APPARATUS WITH A ROLLING CONVOLUTION

| Cross-references: | U.S. Pat. No. | 4,309,872 | 1/1982 | Raser |
|---|---|---|---|---|
| | U.S. Pat. No. | 2,849,026 | 8/1958 | Taplin |
| | U.S. Pat. No. | 3,083,734 | 4/1963 | Taplin |
| | U.S. Pat. No. | 3,137,215 | 6/1964 | Taplin |
| | U.S. Pat. No. | 3,373,236 | 3/1968 | Taplin |

This invention is mainly a bellowslike diaphragm to seal a reciprocating piston in heat engine apparatus. Heat engine apparatus is a Stirling engine, a Stirling-cycle refrigeration system, a Stirling-cycle heat pump or a heat-sensitive cogeneration system. It uses a rolling convolution to achieve large stroke and large displacement volume. Its single convolution rolls in the sense that reciprocating motion causes every cross section along the convolution to become a moving loop.

The object of this invention is to improve rolling diaphragms with respect to service life, resilience and production costs. Life can be improved by using as much metal and as little rubber as possible in the severely flexed part of the diaphragm, by selecting a rubber coated fabric material which has optimum strength characteristics resulting from a curing process which is not impacted by problems associated with complicated mold shapes, and by protecting the rubber or other elastomer from excessive heat. High resilience, which helps avoid a buildup of heat internally at high cycling rates, can be achieved by partial use of metal, by proper material selection and by employing a new planform which minimizes the total strain energy per cycle in the elastomer. Production costs are reduced by fabricating the diaphragms in a way to avoid large molds, i.e., by requiring only small molds for bonding. Not all embodiments achieve all of these features, however, since the geometry is affected by the specific requirements.

For example, consider strain energy minimization. This can reduce hysteresis losses more effectively in diaphragms with long stroke than when the stroke is short. It is achieved by using a planform which equalizes the total lengths of the inner and outer rimlike edges of the convolution so that elastic strain vanishes at these edges and total strain energy can be reduced. For the outer rimlike edge or wall, the plan view is that of a racetrack, i.e., a plane figure consisting of two semicircles and two straight lines.

In more general terms, the object is a substitute for the type of piston and cylinder commonly used in engines and pumps, a substitute which retains as much as possible of their structural and functional characteristics but encounters less friction, leakage and production cost.

These features can be appreciated by reference to four embodiments used in the accompanying drawings, wherein:

FIG. 1 is a perspective view of approximately one-half of the convolution of an elongated rolling diaphragm sealing system;

FIG. 2 is a cross-cut sectional view of a nearly similar system showing the overlapping of two layers of the diaphragm;

FIG. 3 is a perspective view of an assembly of fibers and elastomer called an end tab with the elastomer slightly transparent for viewing the fibers;

FIG. 4 is a lengthwise-cut sectional view of the FIG. 1 system;

FIG. 5 is a schematic drawing of a Stirling-cycle heat engine which not only resembles the engine shown in FIG. 4 of U.S. Pat. No. 4,309,872 but also shows mostly the same numbering of elements;

FIG. 6 is a sectional view of an incomplete Stirling engine which, like FIG. 5, uses a diaphragm in place of a power piston;

FIG. 7 is a perspective view of a slender column element of a cylindrical array of displacers located between the heat source and heat sink of such an engine;

FIG. 8 is a plan view of structure contacting the diaphragm;

FIG. 9 is a sectional view of the sealing system corresponding to line 9—9 of FIG. 8;

FIG. 10 is a sectional view of the diaphragm alone corresponding to line 10—10 of FIGS. 8 and 11;

FIG. 11 is a sectional view of part of the diaphragm taken along line 11—11 of FIG. 10 and is enlarged; and FIG. 12 is part of FIG. 8 for the defining of symbols.

Differences among these drawings involve the use of rim flanges and of an hourglass-shaped rim-length-equalizing planform geometry among the four embodiments numbered E1 to E4 in the following table:

| Embodiment No. | used in FIG. No(s). | type of diaphragm outer edge | type of diaphragm inner edge | inner rim planform |
|---|---|---|---|---|
| E1 | 1, 4 | unflanged | unflanged | racetrack |
| E2 | 2 | unflanged | flanged | racetrack |
| E3 | 3 | flanged | flanged | racetrack |
| E4 | 8 to 12 | flanged | flanged | hourglass |

Prior art is represented by the rolling seal diaphragms which J. F. Taplin describes in U.S. Pat. No. 3,373,236 and in his previous patents and which have a circular-planform convolution. This present invention can be described as a sequence of improvements over this prior art starting with a change in planform from the circular to the shape of a racetrack as shown in FIG. 1, namely, the combination of two semicircles and two straight legs. As illustrated, this simplest embodiment (E1) consists of a baselike frame 1 which is analogous to a cylinder in an engine, a rounded block 2 located inside to function like a piston with a piston rod 11 and a racetrack-shaped-single-convolution diaphragm 4 which fills a uniform gap between the two structural bodies 1 and 2. Thus, in FIG. 1, both the inner and outer rims of the diaphragm have racetrack-shaped plan views. To seal against leaks caused by a difference of pressure across the diaphragm, the outer and inner rim edges are joined to bodies 1 and 2, respectively, by means of adhesive bonding, screws 8, etc.

If the stroke of the pistonlike block is large enough and if the diaphragm is made of an elastic material, the total strain of a narrow peripheral strip in the vicinity of the trough of the convolution can be as much as the difference between the lengths of the inner and outer rims. Although the convolution appears to roll during each stroke, typical hysteresis measurements show more energy dissipated per cycle than can be accounted for when the rolling action is assumed to be free of sliding friction. This is true for both circular and racetrack shaped planforms. At least some of the sliding movement between the diaphragm and bodies 1 and 2 is in the racetrack plane, is near where the convolution trough loses contact and is associated with shear lag in the diaphragm. It is nonlinear in the sense that doubling the curvature along the length of the convolution does not double the hysteresis energy loss, apparently. Anyhow, tests involving different configurations of diaphragms show this: using the same diaphragm material, the same stroke length and volume displacement and the same pressure difference, a diaphragm with a racetrack shaped convolution consistently generates less hysteresis energy loss than one with a circular shape.

In other words, the design shown in FIG. 1 represents an improvement in resilience just because of the shape of the convolution. A further improvement in resilience is made possible because the racetrack shape alone provides an option to make most of the diaphragm out of metal. If the metal and rubber used are hard stainless steel and typical silicone or nitrile, the bulk material resilience values for the metal and the elastomer can be expected to be approximately 99% and 90%, respectively. The difference becomes even greater when fabric is embedded in the elastomer. The part of the diaphragm area that can become metal is the central rectangle, the greater part of the racetrack shape unless the racetrack has very little elongation. In embodiment E2, assuming the inner flange extends all the way inward, the metal is simply a thin rectangular panel 3. This represents all of the area of the diaphragm except for two end tabs 4 which are thin elastomer material and may be relatively small in area.

FIG. 2 shows one of the two cross sections where the two thin materials overlap and are bonded together. FIG. 3 shows one of the end tabs with both the fiber visibility and the space between fibers exaggerated. Except for a difference in shape, it can be fabricated by the method of U.S. Pat. No. 3,373,236 including the procedure for providing sufficient slackness in "circumferential" fibers so they are "extensible". For example, the fiber between points A and B must not be taut.

Use of the central sheet metal panel 3 as shown in FIG. 2 offers an opportunity to accomodate higher operating temperatures, reduce the aging process of the rubber, or both, particularly if a heat sink 16 or other cooling means is provided in the vicinity of each end tab. If the working fluid is subjected to a rise in temperature, a temperature gradient may exist so that the fluid may be cooler at the end tabs. In such cases, a thermal barrier 19 slightly inboard of each end tab as shown in FIG. 4 is useful. It consists of a curved flexible panel of thin steel and insulation layers to partially block flow into and out of the end tabs by springing away from the pistonlike block 2 every cycle. The the cooling means 16 may include a cylindrical bellows inside and concentric to each tab for more surface and less volume. Barrier insulation may be "applon", a combination of teflon and asbestos.

The long narrow planform of the racetrack-shaped diaphragm is sometimes especially convenient. One example is a Stirling-cycle heat engine application where either the heat source or the heat sink has the shape of a long cylinder. Spent nuclear fuel rods and hot brine pipes in certain petroleum operations are examples of such waste heat sources. Diaphragm-type Stirling engines promise effective recovery of such waste heat.

FIG. 5 shows the main elements of a Stirling engine. A power piston 2 sealed by a diaphragm 4 is part of a housing base or frame 1 along with a heat source 5 and a heat sink 16. Using wrist pins 10 and connecting rods 11, a cranking flywheel 12 causes reciprocation of both the power piston 2 and a lever 18, the base 15 of which has a bellowslike seal 14. An extension of the frame 1 is a housing 6 for a linkage 18 which drives an array of displacer elements 17 from the lever 18.

If there is reason for the heat source 5 to be an inner cylinder and the cold side 16 of the engine to an outer concentric cylinder, such a Stirling engine could be configured as shown in FIG. 6. The pistonlike block 2 and its rolling seal 4 are outside of the cool heat-sinking cylinder 1. The present long narrow planform makes this location possible with a minimum of wasted space. However, it requires the displacing elements 17 to have a radial movement.

FIG. 7 shows one of these displacing elements and how its radial movement is achieved. Since these elements 17 serve as both a displacer piston and a regenerator, they are slightly porous and can be fabricated using compacted phosphor bronze fine-mesh screening. In the center of each element 17 is a spring steel strut 20 having slightly offset ends. Each offset end is located with respect to the base plate 15 which bears against it so that a compressive buckling force F is applied along the slender strut 20. Because of the offset ends, the buckling is biased toward radially outward movement. These struts and their biasing form part of the linkage 18. The result is simultaneous reciprocating motion involving flexure of the displacing elements 17 with maximum displacement at their midlength stations. If FIG. 6 is a section viewed at this midlength station, the twelve element sections shown would spend almost half of one cycle in positions where they are in contact with the heat source 5, another nearly half cycle in positions of contact with the outer housing 1, and very little time at various intermediate positions as shown in FIG. 6. Such displacing action is analogous to that of the familiar piston type displacer in many Stirling engines except it represents a time function that is approximately a square wave instead of a sine wave. A book on Stirling engines published by Dr. Ivo Kolin of the Univ. of Zagreb in 1983 describes tests which show the performance superiority of square wave motion of displacers over sinusoidal motion. In such an engine, all four embodiments are potentially applicable.

In such an engine, the feature shown in FIG. 4 is also applicable even though FIG. 6 shows that the diaphram is installed on the cold side of the engine. A WARM ZONE is noted in both FIG. 4 and FIG. 5. But this zone has no abrupt boundary. In a typical Stirling engine, all of the working fluid experiences a rise in temperature and any elastomer anywhere in the engine should be given any thermal protection available. It is expected that the thermal barrier 19 will function somewhat like a secondary regenerator.

Some applications require very large stroke length compared to the width of the gap-filling convolution. In such cases, the preferred embodiment is E4, the embodiment in which those elastomer tensile and compressive strains that are due to the inequality of the lengths of the inner and outer convolution walls can approach zero at the rims. Neglecting the relatively small diaphragm wall thickness, this is implemented by adding some additional curving to the perimeter of the pistonlike block 2 so that its length equals that of the racetrack figure used on the inside of the frame 1. This frame and block are shown in FIG. 8.

In this E4 embodiment, the gap is not uniform. As drawn, the gap width shown in FIG. 10 is five times that shown in FIG. 9. It is preferred that the ratio of maximum to minimum gap width be an integer number, particularly if the diaphragm uses only elastomer coated fabric and no metal. This is because at any station along the convolution, tensile loading is proportional to gap width as long as the pressure is uniform across the diaphragm; thus, the number of layers used can match this integer. The preferred number for this gap ratio is either five or three. Although FIGS. 8 to 12 are all scaled in accordance with a ratio of five, FIG. 11 shows how the layers are added when the ratio is only three, i.e., the number of layers varies from one to three. In this case, the middle layer of the three shows the transition from elastomer 4 to stainless steel 3. All layers are bonded; flange bonding may require overlap or reinforcement.

FIG. 12 defines three radii that relate to this embodiment and one angle, A which must be expressed in radians. It can then be shown that the above planform length equality condition is satisfied if the maximum gap width, c is equal to $$(r+p)[1-\cos A+(2/\pi)(A-\sin A)]$$

Two other definitions are useful. Let a diaphragmlike wall be the combination of either a diaphragm (which can be simply a rolling convolution) or a bellows and some surrounding structure. Let a blocklike structure be a pistonlike element that is either a pistonlike block, which is rigid, or some equivalent structure that may not be entirely rigid.

I claim:

1. In a heat engine, bellowslike apparatus which couples cyclic thermodynamic changes in a fluid to a reciprocating mechanical motion, comprising:
    a baselike frame with a central hole, this hole having the shape of a plane figure comprising two semicircles and two straight lines,
    movable blocklike structure capable of reciprocating translation relative to said frame which surrounds it,
    two thin corrugated walls each having one lengthwise edge attached to and sealed to one straight edge inside said frame and the other lengthwise edge attached to and sealed to a side of said blocklike structure, the axes of the corrugations of these walls being parallel to the straight lines associated with said frame,
    two thin semitoroidal convolution-bearing shells each resembling half of a cylinder and each having one circumferential edge attached and sealed to a curved edge inside said frame and the other to an end of said blocklike structure, the remaining convolution-bearing shell edges being attached and sealed to the remaining corrugation-bearing edges of said walls to form a hermetic structure with variable volume,
    two coaxial cylindrical heat exchangers attached to said baselike frame with both fluid and fluid displacing means contained therebetween, and
    kinematic means connecting both the fluid displacing means of said heat exchangers and said blocklike structure so that cyclic variation of fluid temperature and fluid volume is established in accordance with Stirling engine practice.

* * * * *